United States Patent [19]

Spencer

[11] Patent Number: 4,772,095
[45] Date of Patent: * Sep. 20, 1988

[54] SYMMETRICAL BEAMSPLITTER

[75] Inventor: Gordon R. Spencer, Westwood, Mass.

[73] Assignee: Switchcraft, Inc., Chicago, Ill.

[*] Notice: The portion of the term of this patent subsequent to Apr. 12, 2005 has been disclaimed.

[21] Appl. No.: 946,670

[22] Filed: Dec. 31, 1986

Related U.S. Application Data

[63] Continuation of Ser. No. 513,939, Jul. 15, 1983, abandoned.

[51] Int. Cl.$^4$ ............................................. G02B 27/14
[52] U.S. Cl. ..................... 350/172; 350/174
[58] Field of Search .................. 350/171, 172, 174; 358/66, 64, 60

[56] References Cited

U.S. PATENT DOCUMENTS

| | | | |
|---|---|---|---|
| 2,200,285 | 5/1940 | Lorenzen | 178/5.4 |
| 2,337,980 | 12/1943 | Du Mont et al. | 178/5.4 |
| 2,552,464 | 5/1951 | Siezen | 178/5.2 |
| 2,586,558 | 2/1952 | Oakhill | 178/5.2 |
| 2,677,722 | 5/1954 | Bedford | 178/5.4 |
| 2,965,706 | 12/1960 | Ridgeway | 178/5.4 |
| 3,006,989 | 10/1961 | Schroter | 178/5.4 |
| 3,202,039 | 8/1965 | De Lang et al. | 88/1 |
| 3,280,254 | 10/1966 | Marez | 358/66 |
| 3,291,906 | 12/1966 | Ward et al. | 178/7.85 |
| 3,668,304 | 6/1972 | Eilenberger | 358/49 |
| 3,711,826 | 1/1973 | La Russa | 340/27 |
| 3,778,548 | 12/1973 | Nistri | 178/7.88 |
| 3,885,095 | 5/1975 | Wolfson et al. | 178/7.88 |
| 4,027,328 | 5/1977 | Lessman | 358/64 |
| 4,167,113 | 9/1979 | Mann | 73/178 |
| 4,249,205 | 2/1981 | Buchreeder | 358/60 |
| 4,301,467 | 11/1981 | Jaeger | 358/49 |
| 4,301,468 | 11/1981 | Alvarez | 358/64 |
| 4,368,950 | 1/1983 | Sakamoto | 350/174 |
| 4,431,258 | 2/1984 | Fye | 350/174 |

FOREIGN PATENT DOCUMENTS 39619 11/1981 European Pat. Off. .
56307 7/1982 European Pat. Off. .
(List continued on next page.)

OTHER PUBLICATIONS

GB 2,118,360A, (Applicant's 2–color application corresponding to SN 350,469 published in U.K. on 10/20/83).
Japanese patent application No. 26,140/83, (Applicant's 2–color application corresponding to SN 350,469 published in Japan on 9/16/83).
DE 33 05 314 A1, (Applicant's 2–color application corresponding to SN 350,469 published in W. Germany on 9/1/83).

Primary Examiner—John K. Corbin
Assistant Examiner—P. Dzierzynski
Attorney, Agent, or Firm—John T. Meaney; Richard M. Sharkansky

[57] ABSTRACT

An optical system including a symmetrical beamsplitter comprised of a semi-transparent film of light reflective material sandwiched between two optical plates of transparent materials having respective thicknesses and indices of refraction suitable for providing equivalent optical paths on either side of the film. The beamsplitter may be positioned in optical alignment with an image source and oriented to have one of its surfaces at an angle to said source. Thus, a light ray emanating from the source will have a fractional component transmitted through the film along one optical path and a fractional component will be reflected from the film along an equivalent optical path disposed at an angle to said one optical path. Also, the beamsplitter may be located symmetrically between two image sources such that the light rays emanating from one source and reflected by the beamsplitter together with corresponding light rays emanating from the other source and transmitted by the beamsplitter combine and travel common paths from the beamsplitter film. As a result, an observer's eye or any similar focusing system may be positioned over a relatively large range of viewing angles to receive said combined light rays and produce a composite image.

10 Claims, 5 Drawing Sheets

FOREIGN PATENT DOCUMENTS

| | | |
|---|---|---|
| 1417975 | 10/1965 | France . |
| 1417975 | 10/1965 | France . |
| 1417975 | 10/1965 | France . |
| 1417975 | 10/1965 | France . |
| 1417975 | 10/1965 | France . |
| 424743 | 2/1935 | United Kingdom . |
| 562168 | 6/1944 | United Kingdom . |
| 696615 | 9/1953 | United Kingdom . |
| 1417975 | 10/1965 | France . |
| 1417975 | 10/1965 | France . |
| 1031327 | 2/1966 | United Kingdom . |
| 1417975 | 10/1965 | France . |
| 2029667 | 3/1980 | United Kingdom . |
| 1417975 | 10/1965 | France . |
| 2111712 | 6/1983 | United Kingdom . |

SYMMETRICAL BEAMSPLITTER

This application is a continuation of application Ser. No. 513,939 filed July 15, 1983 now abandoned.

BACKGROUND OF THE INVENTION

1. Field of the Invention

This invention relates generally to optical systems and is concerned more particularly with an optical system including a plate-like beamsplitter having an optically symmetrical structure.

2. Discussion of the Prior Art

An optical beamsplitter may comprise an optical plate made of transparent material and serving as a substrate for supporting on one of its extended flat surfaces a semi-transparent film of light reflective material. When used for splitting a light beam or light image, the beamsplitter is disposed interceptingly in the path of the beam or image and oriented at an angle to said path. As a result, a fractional component of the light beam or image will be transmitted through the film and continue to travel in the original direction of propagation. Also, a fractional component of the light beam or image will be reflected from the angularly oriented film of the beamsplitter and travel in a direction extending at an angle to the original direction of propagation.

When used for combining two light beams or light images travelling along intersecting paths, the beamsplitter is disposed at the intersection of the two paths and oriented at an angle to each of said paths. As a result, one of the light beams or images will be transmitted through the film of the beamsplitter and continue to travel in the original direction of its propagation. The other light beam or image will be reflected from the angularly oriented film of the beamsplitter and travel in the same direction as the light beam or image transmitted through the film. Consequently, if the beamsplitter film constitutes a plane of symmetry between the two angularly disposed sources, the transmitted image and the reflected image travelling from the beamsplitter to the eye of an observer will appear to be superimposed on one another and form a composite image.

Accordingly, there is disclosed in the prior art a number of optical systems, such as used in photographic rangefinders and measuring microscopes, for examples, wherein beamsplitters are disposed for superimposing an image of a reticle or the like on an image of an object being viewed. Also, the prior art includes a number of multi-color image projection systems which use beamsplitters for superimposing different color images of the same object on one another to produce a multi-color composite image. For example, in a copending application Ser. No. 350,469 filed on Feb. 19, 1982 by the present applicant and assigned to the present assignee, there is disclosed "Multi-Color Image Display Apparatus" comprising an optical system coupled to a planar output screen of a display tube for combining two mirror images of the same object produced in different colors, such as red and green, for examples, on respective half-portions of the output screen.

The optical system described in the referenced application Ser. No. 350,469 includes a conventional plate-type beamsplitter aligned with the green light producing half-portion of the output screen and oriented at an angle with respect to the plane of the screen. This beamsplitter comprises a transparent optical plate supporting a film of material which is partly transmissive and partly reflective to green light. Consequently, the green light image emanating from the aligned half-portion of the output screen has a fractional component transmitted through the film in the direction of its original propagation and a fractional component reflected from the film in an orthogonal direction relative to the original direction of propagation. The reflected component is reflected back from a perpendicularly disposed first mirror to the beamsplitter where it is transmitted through the beamsplitter film to an eye of an observer.

In order to recover the beamsplitter transmitted component of the green light image, there may be disposed beyond the beamsplitter and parallel with the output screen a second mirror which is orthogonal to the first mirror. The second mirror reflects the beamsplitter transmitted component of the green light image back to the film of the beamsplitter where it is reflected in the same direction as the beamsplitter reflected component of the green light image leaving the beamsplitter and travelling toward the eye of the observer. As a result, the original beamsplitter transmitted and reflected components of the green light image will appear to the eye of the observer to be superimposed on one another and form a composite green light image, provided that the direction of observation is close to parallel with the optical axis.

However, it has been found that if the direction of observation is changed to be appreciably non-parallel to the optical axis, there may be a noticeable separation of the beamsplitter transmitted and reflected components of the green light image which causes the appearance of a double green image at the eye of the observer. For a given angle of view, the optimum location of the second mirror is dependent upon the refractive index and thickness of the beamsplitter substrate plate, as well as upon which surface of the plate is supporting the film. Unfortunately, the optimum location of the second mirror also is a function of the angle of view.

To correct this problem, it may be proposed that the beamsplitter be of the prism type comprising two right-angle prisms having the semi-transparent film of light reflective material sandwiched between the hypotenuse surfaces of the two prisms. Also, the first and second mirrors may comprise silvered outer surfaces of the two prisms. However, for projection of large images, the prisms would be uncommonly large and, therefore, excessively heavy. Furthermore, it is difficult and costly to achieve adequate optical quality for image projection in large prisms. Moreover, the resulting bulkiness of the large prisms would require a cumbersome mechanism for moving or rotating the beamsplitter off the optical axis in a system which requires such a maneuver.

SUMMARY OF THE INVENTION

Accordingly, this invention provides an optical system with a beamsplitter of the plate-type having an optically symmetrical structure which, in comparison to an equivalent beamsplitter of the prism-type, is less bulky and can be moved or rotated much more readily. This novel beamsplitter comprises a semi-transparent film of light reflective material sandwiched between two optical plates of transparent materials having respective thicknesses and respective indices of refraction suitable for providing substantially equivalent optical paths for the images transmitted through the film and the images reflected from the film. Thus, for optical systems producing large composite images, such as image projection apparatus, for example, it is much easier and less expensive to provide the plates of this novel beamsplitter with the necessary large lateral extension, while maintaining the required optical quality of the plate materials, than it would be to provide the necessary large surface area prisms for an equivalent beamsplitter of the prism-type.

This invention includes an optical system wherein the novel beamsplitter is aligned with an image source and has an adjacent surface oriented at an oblique angle to the source. Consequently, light rays emanating from the image source in the direction of the beamsplitter pass through the adjacent transparent plate and are incident on the film of the beamsplitter at an angle with respect to the normal of the film. As a result, a fractional component of each ray is reflected from the film at an angle having a magnitude equal to the angle of incidence; and another fractional component of the ray is transmitted through the film to enter the other transparent plate of the beamsplitter at an angle having a magnitude equal to the angle of incidence. Accordingly, the reflected and transmitted components of the ray pass through the transparent materials of the respective plates along equivalent optical paths and emanate from respective opposing surfaces of the beamsplitter.

Disposed in the paths of the reflected and the transmitted components may be respective first and second mirrors which are oriented symmetrically relative to the beamsplitter film. As a result, the first and second mirrors direct the respective ray components back along paths which intersect at a surface of symmetry where this novel beamsplitter is disposed as an image combiner. Consequently, the originally reflected and transmitted components of each ray, after reflection from the respective first and second mirrors, travel equivalent optical paths through respective paths of the beamsplitter and are recombined at the beamsplitter film where the recombined ray is again split into two components, one transmitted back to the image source and the other reflected toward the observer. Accordingly, the image reflected from the first mirror being transmitted through the film and the image reflected from the second mirror being reflected from the film appear to the eye of the observer to be superimposed on one another as a recombined image.

If the direction of observation is changed an appreciably large angle with respect to the axial direction, there is no noticeable separation of the two images forming the recombined image because the optically symmetrical structure of this inventive beamsplitter provides optically equivalent paths for the respective reflected and transmitted components of the light rays emanating from the image source.

This invention also includes an optical system wherein the novel beamsplitter has its sandwiched film located as a surface of symmetry between two angularly disposed image sources, as viewed from the beamsplitter. Consequently, light rays emanating from a discrete area of one image source are incident on the adjacent plate surface of the beamsplitter and within the beamsplitter travel along one optical path extending through the adjacent beamsplitter plate, the beamsplitter film, and the other beamsplitter plate to emerge from the opposing plate surface of the beamsplitter and travel, such as in a direction substantially parallel with the optical axis, for example, toward the eye of an observer. Light rays emanating from a corresponding discrete area of the other image source are incident on said opposing surface of the beamsplitter and within the beamsplitter travel along an optical path equivalent to said optical path by passing through the adjacent beamsplitter plate, being reflected from the film and travelling back through said adjacent beamsplitter plate along the path portion followed by the light rays from said one image source. As a result, the light rays emanating from corresponding discrete areas of the respective image sources emerge from said opposing plate surface of the beamsplitter together and travel in the same direction toward the eye of the observer. Accordingly, at the observer's eye, the two images from the respective sources appear superimposed on one another and form a recombined image. Because of the symmetrical structure of this novel beamsplitter, the two images still appear superimposed on one another even when the direction of observation is appreciably non-parallel with the axial direction.

BRIEF DESCRIPTION OF THE DRAWINGS

For a more complete understanding of the invention, reference is made in the following detailed description to the accompanying drawings wherein.

DESCRIPTION OF THE PREFERRED EMBODIMENTS

Figure 1:
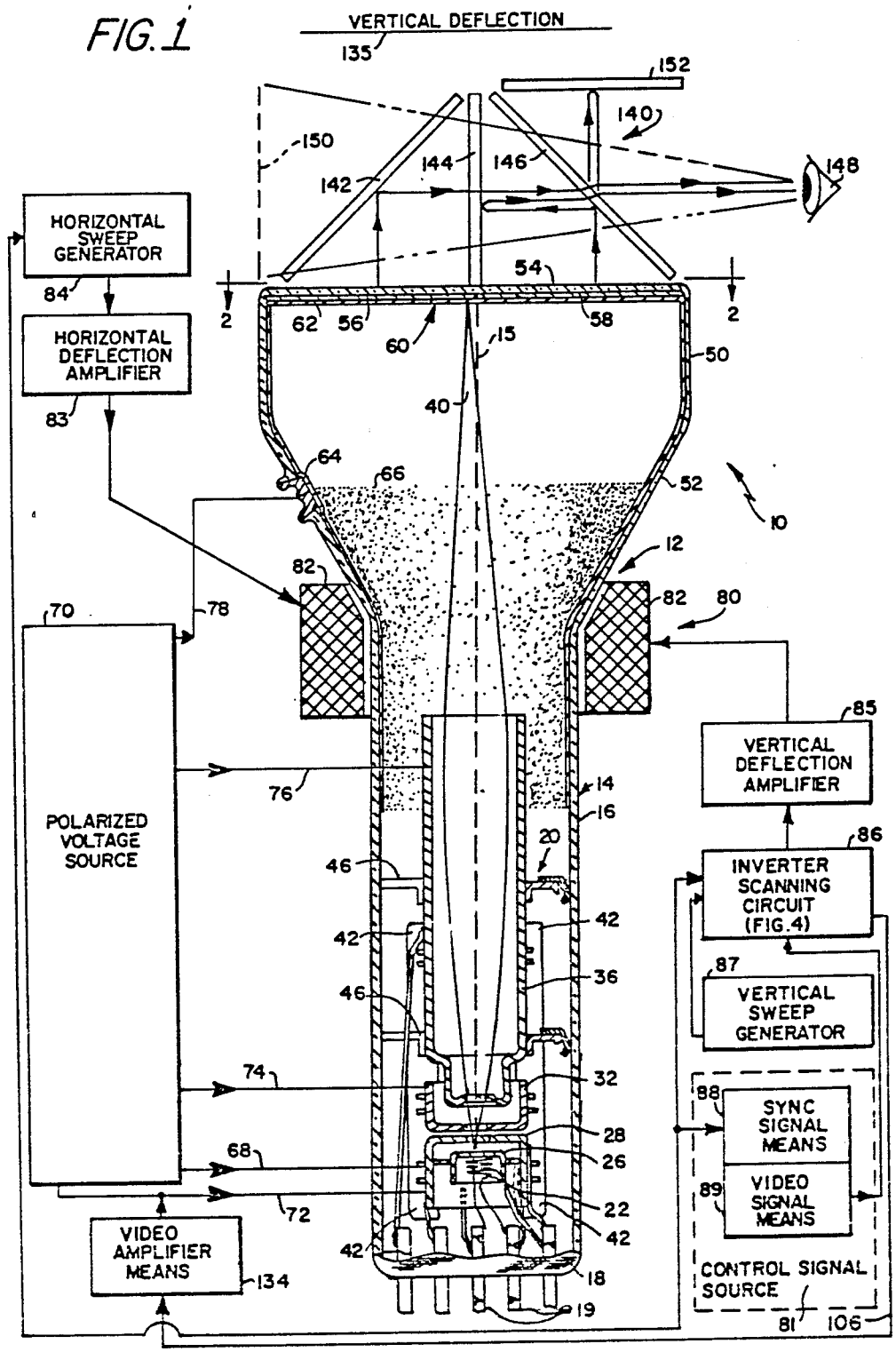
FIG. 1 is an axial sectional and schematic view of multi-color image display apparatus embodying the invention.

Referring to the drawings wherein like characters of reference designate like parts, there is shown in FIG. 1 a multi-color image display apparatus 10 comprising a cathode ray type of tube 12. The tube 12 is provided with a funnel-shaped envelope 14 made of suitable dielectric material, such as glass, for example, and has an axial centerline 15 which extends into a neck-end portion 16 of envelope 14. Neck-end portion 16 terminates at one end of envelope 14 in a peripherally sealed stem press 18 through which a circular array of spaced terminal pins 19 extends hermetically. The terminal pins 19 provide means for supporting and making electrical connections to respective elements of an electron gun 20 which is disposed axially within the neck-end portion 16.

The electron gun 20 includes a filamentary heater 22 axially disposed adjacent the stem press 18 and within an inverted cathode cup 26 which has a closed end provided with an outer coating (not shown) of heat sensitive, electron emitting material. Cathode cup 26 is axially disposed in spaced relationship within an inverted first grid cup 28 which has a centrally apertured, closed end aligned with the adjacent closed end of cathode cup 26. The closed end of inverted first grid cup 28 is disposed in close juxtaposed relationship with a centrally apertured, closed end of an upright second grid cup 32. Extending in spaced relationship within the opposing open end of second grid cup 32 is a centrally apertured, closed end of an elongated focussing cup 36.

The opposing open end of focussing cup 36 constitutes the exit end portion of gun 20 from which an electron beam 40 is directed axially toward the opposing end portion of envelope 14. The respective beam-forming electrodes 28, 32 and 36 of gun 20 are insulatingly attached to one another, as a sub-assembly, for example, by being fixedly secured to a plurality of axially extending dielectric rods 42 which are angularly spaced apart about the gun 20. Also, the sub-assembly of respective beam-forming electrodes 28, 32 and 36 may be held substantially on the axial centerline 15 by means of a plurality of axially spaced collars 46 which encircle electrodes of the gun 20 and press against the inner surface of neck-end portion 16.

The neck-end portion 14 is integrally joined to an opposing larger diameter end portion 50 of envelope 12 through an interposed outwardly flared portion 52 thereof. Larger diameter end portion 50 terminates in a peripherally sealed faceplate 54 which is made of transparent material, such as glass, for example. Deposited by conventional means on the inner surface of faceplate 54 is an output phosphor screen 60 comprising respective half portions, 56 and 58, respectively. The half portion 56 is made of a phosphor material, such as europium activated yttrium oxide, for example, which emits red light locally when penetrated by electrons from the beam 40. The half portion 58 is made of a different phosphor material, such as manganese activated zinc silicate, for example, which emits green light locally when penetrated by electrons from the beam 40. Thus, the respective half portions 56 and 58 of phosphor screen 60 are disposed in the same plane and have respective adjoining edge portions disposed substantially on an axial centerline 15 of envelope 12.

Disposed on the inner surface of phosphor screen 60 is an anode coating 62 of electrically conductive material, such as aluminum, for example, which reflects visible light. The coating 62 extends not only over the entire inner surface of larger diameter end portion 50 but also extends axially as well as annularly into the flared portion 52 of the envelope 12. Anode coating 62 is electrically connected to an anode terminal button 64 extending hermetically through the wall of flared portion 52 for the purpose of making an electrical connection to the anode electrode of tube 12. The anode terminal button 64 and the anode coating 62 are electrically connected to another anode coating 66 which extends from the button 64 toward the neck-end portion 14 of envelope 12. Coating 66 is made of suitable electrically conductive material, such as carbon, for example, which extends axially and annularly along the sloped inner surface of flared portion 52 and into the neck-end portion 16. Within neck-end portion 16, the anode coating 66 terminates in spaced encircling relationship with the exit end portion of gun 20 from which emerges the axially directed electron beam 40. Thus the respective anode coatings 66 and 62 form a generally inverted cup-shaped anode electrode which has established therein a substantially field-free space.

In operation, as shown schematically in FIG. 1, the cathode 26 of gun 20 may be electrically connected through a conductor 68 to a cathode voltage terminal of a polarized voltage source 70. The first grid electrode 28 of gun 20 may be connected electrically through a conductor 72 to a voltage terminal of source 70 which is electrically negative with respect to the cathode voltage terminal for the purpose of controlling the flow of electrons in the beam 40. The second grid electrode 32 of gun 20 may be connected electrically through a respective conductor 74 to an associated voltage terminal of source 70 which is more positive relative to the cathode voltage terminal; and the focussing electrode 36 of gun 20 may be connected electrically through a respective conductor 76 to an associated voltage terminal of source 70 which is still more positive with respect to the cathode voltage terminal of source 70. The anode terminal button 64 may be connected electrically through a conductor 78 to an anode voltage terminal of source 70 which is highly positive electrically with respect to the cathode voltage terminal of source 70. Thus, the respective beam forming electrodes 28, 32, 36 of gun 20 and the cup-shaped anode electrode of tube 12 are maintained at suitable electrical potentials relative to the potential of cathode 26 to focus the electrons of beam 40 onto a small spot area of phosphor screen 60 for producing a localized emission of visible light from the penetrated phosphor material.

A beam deflection system 80 has encircling the outer surface of neck-end portion 16, adjacent the flared portion 52 of envelope 14, an electromagnetic deflection yoke 82 through which the electron beam 40 exiting from gun 20 passes. The yoke 82 comprises an opposing pair of interconnected horizontal deflection coils (not shown) which are electrically connected through a conventional horizontal deflection amplifier 83 to a conventional horizontal sweep generator 84. The yoke 82 also includes an opposing pair of interconnected vertical deflection coils which are electrically connected through a conventional vertical deflection amplifier 85 to an inverter scanning circuit 86. Inverter scanning circuit 86 receives sweep signals from a conventional vertical sweep generator 87 and drive signals from a conventional sync signal means 88. The sync signal means 88 comprises a component of a control signal source 81 which also sends the drive signals to horizontal sweep generator 84. The inverter scanning circuit 86 also receives signals from a conventional video signal means 89 comprising another component of source 81, and feeds output signals through a conventional video amplifier means 134 to the first grid electrode 28 of tube 12.

Figure 4:
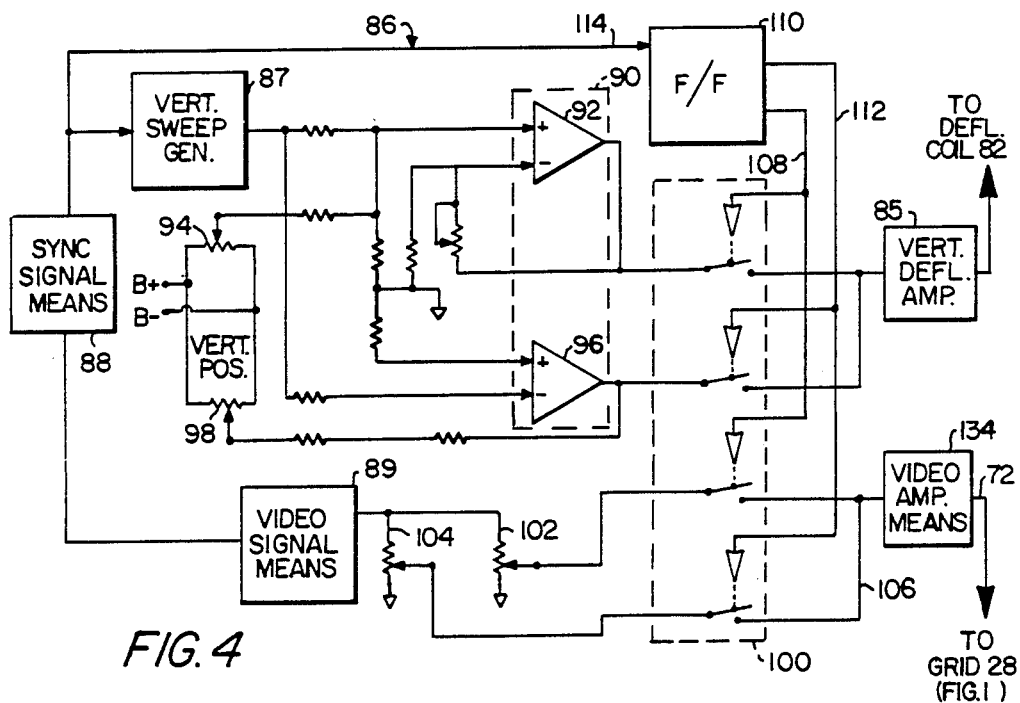
FIG. 4 is a schematic view of the inverter scanning circuit of the beam deflection means shown in FIG. 1.

As shown in FIG. 4, the inverter scanning circuit 86 includes a dual operational amplifier device 90 of the commercial type, such as Op Amp MC 1747 sold by Motorola Semiconductor Products of Pheonix, Ariz., for example. The device 90 includes an operational amplifier 92 having a non-inverting (+) input terminal resistively connected to the output terminal of vertical sweep generator 87 and is resistively connected to the wiper arm of DC offset potentiometer 94. Operational amplifier 92 also has its non-inverting (+) and inverting (−) input terminals electrically connected through respective resistors to electrical ground. Device 90 also includes an operational amplifier 96 having an inverting (-) input terminal resistively connected to the output terminal of vertical sweep generator 87 and resistively connected to the wiper arm of a DC offset potentiometer 98. The non-inverting (+) input terminal of operational amplifier 96 is resistively connected to electrical ground.

The output terminals of operational amplifiers 92 and 96 are connected resistively to their respective inverting (−) input terminals and also are connected electrically to respective input terminals on one-half of an integrated circuit switching device 100 which has an output terminal connected electrically to the vertical deflection amplifier 85. The device 100 may be of a commercially available type, such as Dual-In-Line Package DG 201 BP, Quad SPST, CMOS Analog Switch, sold by Siliconix of Santa Clara, Calif., for example. The other half of switching device 100 has respective input terminals connected electrically to the wiper arms of video gain potentiometers, 102 and 104, respectively, and has an output terminal connected electrically through a conductor 106. The conductor 106 is connected electrically through the video amplifier means 134 and conductor 72 to the first grid electrode 28 (FIG. 1). Each half of switching device 100 has respective actuating terminals connected to an output terminal 108 of a flip-flop (F/F) device 110, and has respective other actuating terminals connected to an output terminal 112 of device 110. The device 110 may be of a commercially available type, such as Model SN 7473 Dual J-K With Clear made by Motorola Semiconductor Division of Pheonix, Ariz., for example. The device 110 has a clocking or sync input terminal 114 connected electrically to the sync signal means 88.

Figure 5:
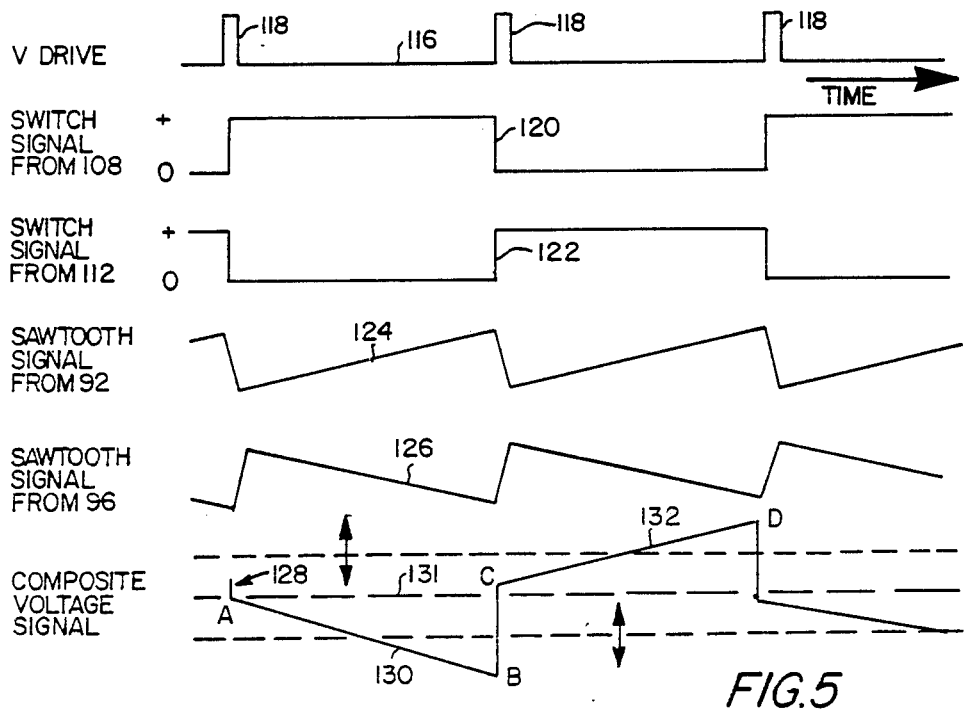
FIG. 5 is a diagrammatic view of electrical signal waveforms generated in the use of the circuit shown in FIG. 4.

Accordingly, the sync signal means 88 applies to the input terminal 114 of flip-flop device 110 a drive signal voltage which, as shown in FIG. 5, may be represented by the waveform 116 having regularly spaced pulses 118. Upon receipt of a pulse 118, the device 110 changes from one to the other of two operating states thereby changing the output voltages applied to its respective output terminals 108 and 112 correspondingly. Thus, as shown by the associated square waveforms, 120 and 122, respectively, a pulse 118 at the input terminal 114 may cause the device 110 to apply a positive voltage pulse to its output terminal 108, for a predetermined interval of time, while a zero voltage pulse is applied to the output terminal 112. Upon receipt of the next drive pulse 118 at its input terminal 114, the device 110 changes its mode of operation to apply a positive voltage pulse to its output terminal 112, for an equal predetermined interval of time, while a zero voltage pulse is applied to its output terminal 108.

As a result, the switching device 100 is actuated for the predetermined interval to connect the output terminal of operational amplifier 92 to the vertical deflection amplifier 85 such that it receives a voltage signal represented by the positive going sawtooth waveform 124. Then, the switching device 100 is actuated for the equal predetermined interval of time to connect the output terminal of operational amplifier 96 to the vertical deflection amplifier 85 whereby it receives a voltage signal represented by the negative going sawtooth waveform 126. Consequently, the vertical deflection amplifier 85 receives a composite voltage signal represented by the waveform 128 having a negative going sawtooth pulse 130 which commences at value A, as set by wiper arm of potentiometer 94, corresponding to the adjoining edges of screen portions 56 and 58 and terminates at a value B. The waveform 128 then has an alternate positive going sawtooth pulse 132 which commences at a value C, as set by wiper arm of potentiometer 98, above center value 131 and terminates at a value D.

The deflection amplifier 85 is of the conventional type for converting the received voltage signal 128 to equivalent electrical current which flows through the yoke 82 to establish a corresponding magnetic field for deflecting the electron beam 40. Accordingly, the electron beam 40 (FIG. 1) is deflected in line-by-line fashion to scan a raster area of phosphor screen portion 56 from the centerline 15 of tube 12 toward the periphery of faceplate 54 in the direction shown by the arrow 133. Then, the electron beam is deflected vertically to a point below the centerline 15 of tube 12 and is deflected laterally in line-by-line fashion to scan a symmetrically inverted raster area of phosphor screen portion 58 from the point below centerline 15 of tube 12 toward the periphery of faceplate 54. Thus, the inverter scanning circuit 86, together with horizontal and vertical sweep generators, 84 and 87, respectively, comprises a mirror raster generating means for causing the beam 40 to scan symmetrically inverted raster areas on the viewing screen portions 56 and 58, respectively.

As shown in FIG. 1, the video signal means 89 functions through the inverter scanning circuit 86 and the video amplifier means 134 to vary the potential of first grid electrode 28 instantaneously with respect to the potential of cathode 26 and thereby produce corresponding instantaneous variations in the electron current of beam 40 as it scans each of the mirror raster areas on screen portions 56 and 58, respectively.

Referring again to FIG. 4, it may be seen that when the switching device 100 is actuated to connect the output of operational amplifier 92 to vertical deflection amplifier 85, it also connects the wiper arm of potentiometer 102 through output conductor 106, video amplifier means 134, and conductor 72 to the first grid electrode 28 of tube 12. Similarly, when the switching device 100 is actuated to connect the output of operational amplifier 96 to deflection amplifier 85, it also connects the wiper arm of potentiometer 104 to the first grid electrode 28 of tube 12. Consequently, when the beam 40 is scanning respective inverted raster areas on the two half portions 56 and 58 of phosphor screen 60, the video signal from video signal means 89 applied to first grid electrode 28 can be adjusted to give the desired intensity of light emitted from the respective phosphor materials comprising the viewing screen portions 56 and 58.

Figure 2:
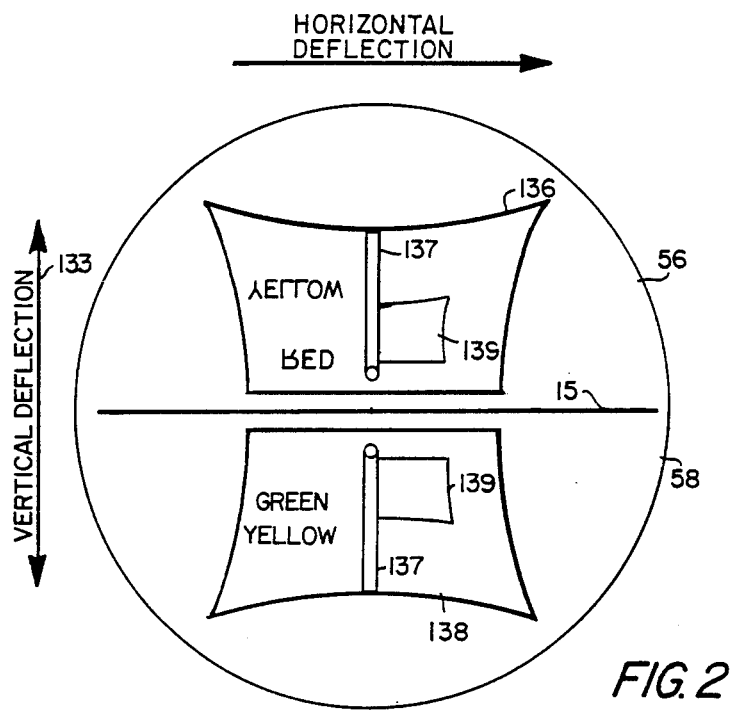
FIG. 2 is a plan view of the output end portion of the tube shown in FIG. 1 as taken along the line 2—2 and looking in the direction of the arrows.

Accordingly, as shown in FIG. 2, there is produced on the screen portions 56 and 58 different color mirror images 136 and 138, respectively, of the same subject matter, such as a flag 139 extended outwardly from a flag pole 137, for example. The image 136 is produced by localized emission of red light from the phosphor material of screen portion 56; and the image 138 is produced by the localized emission of green light from the different phosphor material of screen portion 58. However, it is important to note that pin-cushion distortions in the two images, 136 and 138, respectively, have been exaggerated to show the mirror symmetry even of these distortions. Thus, due to the physical symmetry achieved in the described operation of tube 12, even imperfections which occur in the image 136 when the beam 40 is scanning the red portion 56 of screen 60 on one side of the centerline of tube 12 are symmetrically repeated in the image 138 when the beam 40 is scanning the green portion 58 of screen 60 on the other side of the centerline of tube 12. Accordingly, if the respective mirror images 136 and 138 are folded congruently onto one another along their respective edges adjacent centerline 15, not only will the respective straight flag poles 137 be in registration with one another but also any curvature in the edge portions of the symmetrically disposed flags 139 will be in registration with one another without requiring any compensation or correction for the distortions.

Referring again to FIG. 1, there is shown optically coupled to the phosphor screen 60 an optical system 140 which may be conventionally supported in preferred positional relationship with respect to the plane of screen portions 56 and 58. The system 140 includes a dichroic mirror 144, which is transmissive to red light and reflective to green light, is disposed coplanar with the axial centerline of tube 12 and the adjoining edges of screen portions 56 and 58, respectively. A second mirror 142, which is reflective to the red light emitted by screen portion 56, is disposed in alignment with the screen portion 56 and oriented at about a forty-five degree angle with respect to the plane of screen portion 56 and to the plane of dichroic mirror 144. A plate-like beamsplitter 146, which is transmissive to red light and partly reflective, partly transmissive to the green light emitted by screen portion 58, is disposed in alignment with screen portion 58 and oriented at about a forty-five degree angle with respect to the plane of screen portion 58 and to the plane of dichroic mirror 144. The beamsplitter 146 has an optically symmetrical structure which will be described more specifically in connection with FIG. 6.

In operation, red light from the image 136 produced on screen portion 56 is reflected from mirror 142 and passes through the mirror 144 to beamsplitter 146, where a substantial portion of the red light is transmitted through the beamsplitter 146 to the eye 148. On the other hand, green light from image 138 produced on screen portion 58 is partially reflected from the beamsplitter 146 to the dichroic mirror 144 where it is reflected back to beamsplitter 146. A substantial portion of the green light reflected from mirror 144 passes through beamsplitter 146 to the eye 148.

Figure 3:
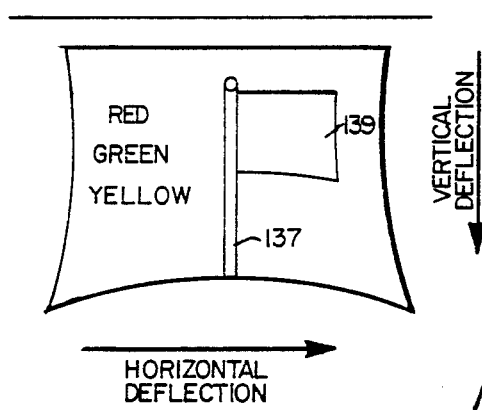
FIG. 3 is an elevation view of the output end portion of the optical system shown in FIG. 1, as seen from the position of the observer's eye.

It should be noted that the images 136 and 138 are symmetrical mirror images which can be optically folded congruently onto one another. Also, the described optical components of system 140 are arranged to provide equal optical path lengths for the red and green rays travelling from corresponding discrete areas of these images to the eye. Furthermore, the red and green light rays emanating from corresponding discrete areas of the respective images 136 and 138 arrive at the eye 148 from identical directions. Consequently, as shown in FIG. 3, corresponding discrete areas of the images 136 and 138 are seen by the eye 148 to be in registration with one another. As a result, it appears to the eye 148 that the images 136 and 138 are superimposed on one another in a virtual image plane 150 located behind the mirror 144.

The optical distance from virtual image plane 150 to the eye 148 is identical to the optical distance from images 136 and 138 to the eye 148, and may be imagined to have been created by unfolding the paths of the light rays at the reflecting surfaces. The color in each of the discrete areas of the multi-color image arriving at the eye 148 is determined by the relative intensities of red and green lights in corresponding discrete areas of the images 136 and 138, respectively. The red intensity in image 136 and the green intensity in image 138 may be controlled by the amplitudes of the video signals applied between the grid 28 and the cathode 26 during the time intervals when the beam 40 is scanning the red portion 56 and the green portion 58, respectively, of the phosphor screen 60.

As previously described, the green light from image 138 on screen portion 58 is partly reflected by the beamsplitter 146 to the dichroic mirror 144. However, the green light from image 138 also is partly transmitted through the beamsplitter 146 to continue travelling in the original direction of propagation from screen portion 58. The beamsplitter 146 is partly transmissive to green light for permitting passage directly through the beamsplitter 146 of the green light image reflected from dichroic mirror 144. Therefore, in order to recover the green light from image 138 transmitted through the beamsplitter 146, there is disposed interceptingly in the path of the transmitted green light a highly reflective mirror 152 which is oriented substantially parallel to the plane of screen portion 58 and substantially perpendicular to the dichroic mirror 144. Consequently, the recovery mirror 152 is designed and positioned for reflecting a green light image transmitted through beamsplitter 146 back to the beamsplitter 146 where it is reflected by the beamsplitter 146 in the direction of the eye 148.

Figure 7:
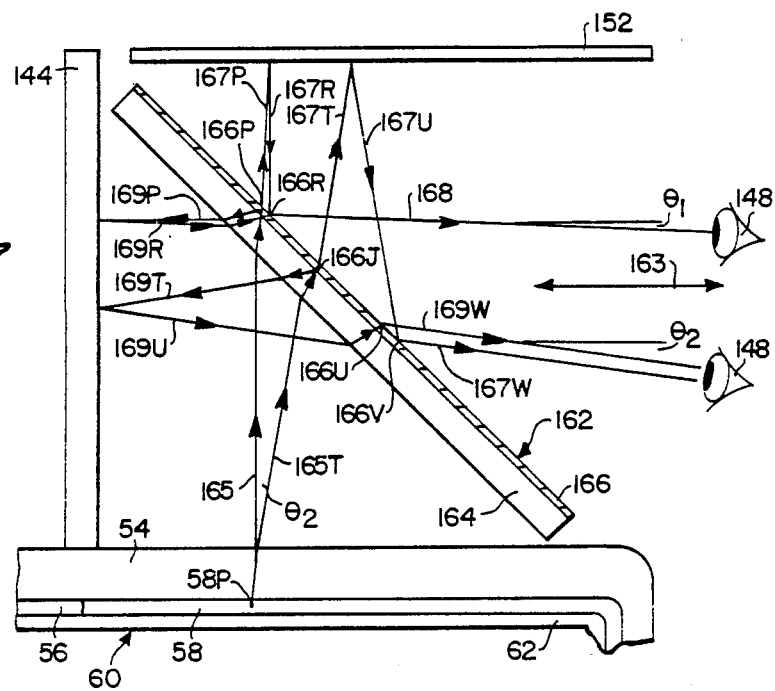
FIG. 7 is a fragmentary schematic view similar to FIG. 6 but having a conventional plate-type beamsplitter disposed in place of the novel plate-type beamsplitter of this invention.

As shown in FIG. 7, there may be disposed in place of the novel beamsplitter 146 a conventional plate-type beamsplitter 162 comprising an optical transparent plate 164 supporting on its extended flat surface adjacent mirror 152 a semi-transparent film 166 of light reflective material. It has been found that when the conventional beamsplitter 162 is used and the eye 148 is disposed to view the image in a direction substantially parallel to the axial direction represented by line 163, the recovery mirror 152 may be positioned with respect to the beamsplitter 162 such that the beamsplitter transmitted green light image, which is reflected from mirror 152, appears to the eye 148 to be superimposed on the beamsplitter reflected green light image, which is reflected from the dichroic mirror 144. The reason for this apparent superposition of the green light images is that the film 166 of conventional beamsplitter 162 constitutes a plane of optical symmetry between the respective mirrors 144 and 152 when the eye 148 is positioned to view the image in a direction substantially parallel to the axial direction 163.

Thus, a light ray 165 emanating from a point 58P of screen portion 58 at or close to normal with the plane of screen portion 58, is refracted at the surface of the beamsplitter substrate plate 164 and is incident at a predetermined angle on a point, such as 166P, for example, of beamsplitter film 166. As a result, a component light ray 167P is transmitted through the point 166P of film 166 and travels in a direction substantially parallel to the original direction of propagation of light ray 165. Also, a component light ray 169P is reflected from the point 166P of film 166 and, after refraction at the surface of substrate plate 164, travels in a direction substantially orthogonal to the original direction of propagation of light ray 165. The transmitted component ray 167P is reflected from recovery mirror 152 as a light ray 167R; and the reflected component ray 169P is reflected from dichroic mirror 144 as a light ray 169R. These reflected light rays 167R and 169R are incident on the film 166 at points sufficiently close together that they may be represented as a single point 166R. Therefore, the light ray 167R, which is reflected from the point 166R of film 166, and the light ray 169R, which is transmitted through the point 166R of film 166 travel in substantially the same direction toward the observer's eye 148, which is within the small angle $\theta_1$ with respect to the axial direction 163. Accordingly, to the eye 148 positioned within the small angle $\theta_1$ the two rays 167R and 169R appear to comprise a single combined ray 168.

However, in practice, the eye 148 may be moved to observe the point 58P of screen portion 58 from a direction making an appreciably large angle $\theta_2$, such as greater than ten degrees, for example, with respect to the axial direction 163. As a result, there may be a noticeable separation between the beamsplitter transmitted green light image and the beamsplitter reflected green light image because the film 166 no longer constitutes a plane of optical symmetry between the respective mirrors 144 and 152. Accordingly, each discrete area of film 166 may be located at a greater or lesser optical path length from the associated area of mirror 144 than the optical path length from the same area of film 166 to the corresponding area of mirror 152.

Thus, a light ray 165T emanating from the point 58P of screen portion 58 and leaving the faceplate 54 at an angle $\theta_2$ from the normal to the plane of screen portion 58 is refracted at the surface of the plate 164 of conventional beamsplitter 162 and is incident on the film 166 at a point, such as 166T, for example. As a result, a component light ray 167T is transmitted through the point 166T of semi-transparent film 166 and travels in a direction substantially parallel to the original direction of propagation of ray 165T. Also, a component light ray 169T of ray 165T is reflected from the point 166T of film 166 and, after refraction at the surface of the substrate plate 164, travels a path which is not orthogonal to the original direction of propagation of ray 165T. The transmitted component ray 167T is reflected from the recovery mirror 152 as light ray 167U which is incident on the film 166 at the point 166V. On the other hand, the reflected component ray 169T is reflected from the dichroic mirror 144 as light ray 169U which, after refraction at the surface of substrate plate 164, is incident on the film 166 at a point 166U significantly displaced from the point 166V of film 166. Consequently, the beamsplitter transmitted component ray 167T and the beamsplitter reflected component ray 169T approach the observer's eye 148 along laterally displaced paths 167W and 169W, respectively. Accordingly, the beamsplitter transmitted green light image and the beamsplitter reflected green light image appear to the eye 148 as a double green light image.

It has been found that, for a given angle of view, the optimum location of the recovery mirror 152 with respect to the beamsplitter 162 is dependent upon the refractive index and thickness of the conventional beamsplitter substrate material, as well as upon which extended flat surface of the substrate supports the semi-transparent film of light reflective material. Unfortunately, this optimum location of the recovery mirror 152 also is a function of the viewing angle.

Figure 6:
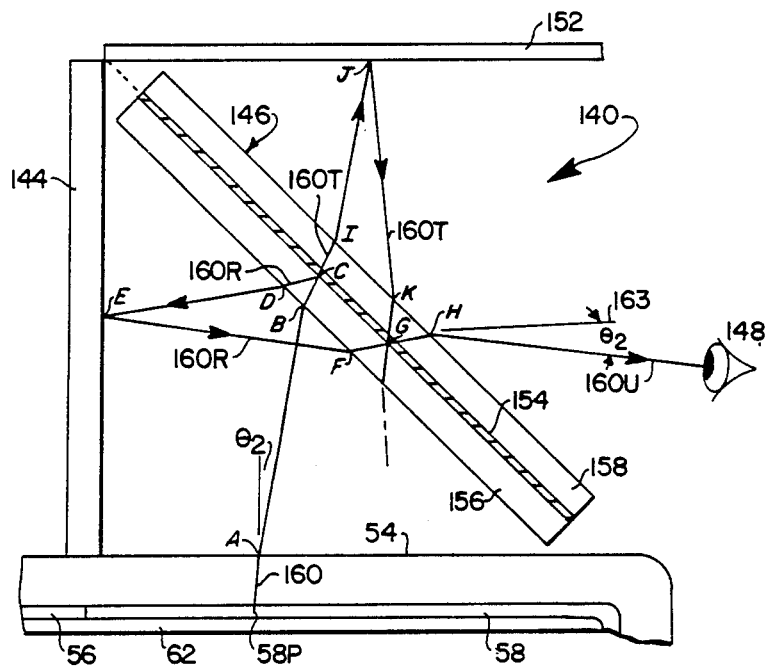
FIG. 6 is an enlarged fragmentary schematic view of an output portion of the display tube and an aligned portion of the optical system embodying the beamsplitter shown in FIG. 1.

Therefore, in order to eliminate the green light image separation, the optical system 140 is provided with the novel beamsplitter 146 which has an optically symmetrical structure for both the transmitted and the reflected green light images. As shown in FIG. 6, the beamsplitter 146 comprises a semi-transparent film 154 sandwiched between respective optical plates 156 and 158 made of transparent material, such as glass, for example. The film 154 is made of a material which, in the proper thickness, is partly reflective and partly transmissive to green light. Plates 156 and 158 may be provided with substantially equal thicknesses and may be made of respective materials having substantially equal indices of refraction. The film 154 may be deposited on an extended flat surface of one of the transparent plates by suitable means, such as evaporation or sputtering, for examples. Then, the surface of the plate supporting the film 154 may be bonded, as by an optically clear cement for example, to an extended flat surface of the other one of the transparent plates 156 and 158, respectively.

Thus, a ray 160 of green light emanating from the point 58P of screen portion 58 may emerge from faceplate 54 at a point A and travel through a suitable interfacing medium, such as air, for example, along a path AB. The path AB may be disposed at any arbitrary angle $\theta_2$ with respect to the normal of faceplate 54. Consequently, the ray 160 is incident on the adjacent angularly disposed flat surface of beamsplitter plate 156 at a point B and at a predetermined angle of incidence. The ray 160 is refracted at the surface of plate 156 to travel a path BC in accordance with the index of refraction of the plate material and is incident on the adjacent surface of film 154 at a point C and at a predetermined angle of incidence. As a result, there is produced a reflected ray 160R which travels back through the material of plate 156 along a path CD at an angle with respect to the normal of film 154 equal in magnitude to the angle of incidence of ray 160 at point C.

Also, there is produced at point C a transmitted ray 160T which travels through the material of plate 158 along a path CI. The path CI is disposed at an angle with respect to the normal of film 154 equal in magnitude to the angle of incidence of ray 160 at point C, since the respective materials of plates 156 and 158 have substantially equal indices of refraction. The transmitted ray 160T emerges from the far surface of plate 158 and travels through a suitable interfacing medium, such as air, for example, along a path IJ. Also, the reflected ray 160R emerges from the near surface of plate 156 and travels through air along a path DE. The respective paths DE and IJ are disposed at substantially equal angles with respect to the normal of film 154 because the materials of plates 156 and 158 not only have substantially equal indices of refraction but also respective opposing surfaces which are substantially parallel to the film 154. Also, the media adjacent opposing exposed surfaces of the plates 156 and 158 either are of the same material or have substantially equal indices of refraction. Consequently, provided that the mirrors 152 and 144 are symmetrically disposed relative to film 154, the reflected ray 160R and the transmitted ray 160T are incident at respective equi-distant points E and J on the adjacent surfaces of respective mirrors 144 and 152 at substantially equal angles of incidence relative to their respective normals.

Accordingly, the reflected ray 160R and the transmitted ray 160T are reflected from the mirrors 144 and 152 at respective angles of reflection which are substantially equal in magnitude and travel along respective equal length paths EF and JK. Thus, the reflected ray 160R and the trasmitted ray 160T are incident on the opposing angularly disposed flat surfaces of beamsplitter 146 at respective equal magnitude angles of incidence relative to the normal of film 154 and are refracted at the surfaces of plates 156 and 158, respectively. As a result, the reflected ray 160R and the transmitted ray 160T are incident at substantially equal magnitude angles of incidence on opposing surfaces of the film 154 which is disposed in a plane of symmetry between the respective mirrors 144 and 152. A portion of the reflected ray 160R is transmitted through film 154 at a point G, and travels along a path GH at an angle substantially equal in magnitude to its angle of incidence with respect to the normal of film 154. A portion of the transmitted ray 160T is reflected from film 154 at the point G, and also travels along a path substantially identical to the path GH followed by the ray 160R. Consequently, portions of the reflected ray 160R and the transmitted ray 160T are combined and emerge from the exposed surface of plate 158 at the point H. The combined rays 160R and 160T, respectively, are refracted at the point H and travel as a combined ray 160U through the interfacing air medium to the eye 148 which may be positioned off-axis by amount equal to the angle $\theta_2$.

Since the recombination of reflected ray 160R and transmitted ray 160T has been shown for any arbitrary angle $\theta_2$, it can be seen to be valid for all points, such as 58P of the output screen portion 58, for example, and viewing angles $\theta_2$ of the eye 148 with the optical axis of system 140. Accordingly, the symmetrical optical structure of beamsplitter 146 provides equivalent optical paths for the reflected ray 160R and the transmitted ray 160T whereby the combined rays may be viewed over a wide angle without separation occurring. It further follows that an array of light emitting points, such as 58P, for example, constituting the image produced by output screen portion 58 emit light rays which follow beamsplitter transmitted and reflected paths, as described, and will be correspondingly recombined.

Figure 8:
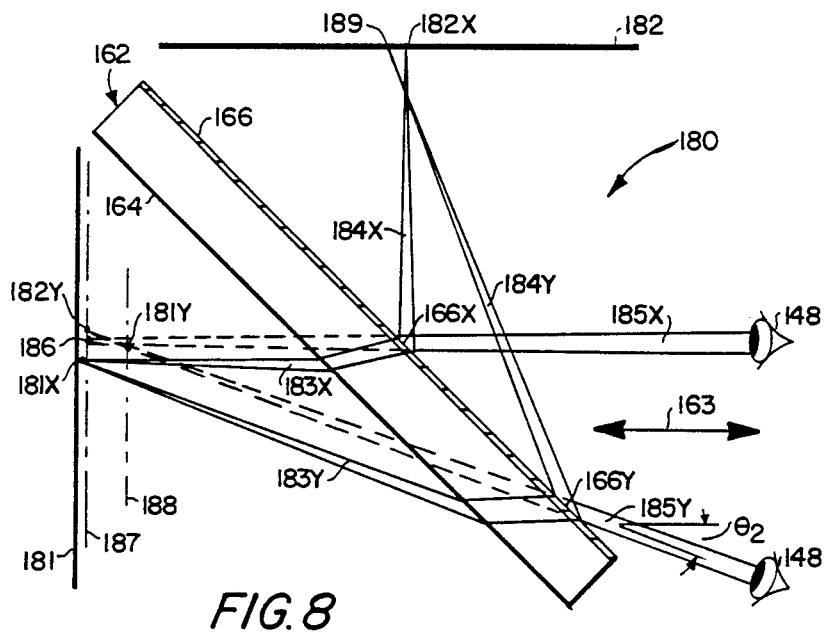
FIG. 8 is a schematic view of an alternative optical system having a conventional plate-type beamsplitter positioned symmetrically between two angularly disposed image sources.

As shown in FIG. 8, an alternative embodiment may comprise an optical system 180 including first and second image sources, 181 and 182, respectively, which are disposed orthogonally relative to one another for directing respective images along intersecting paths. The image source 181 may comprise a specimen, for example; and the image source 182 may comprise a reticle, for example. Angularly disposed between the respective sources 181 and 182 is an image combiner means which may comprise the conventional beamsplitter 162 having the transparent substrate plate 164 supporting on one of its extended flat surfaces the semi-transparent film 166 of light reflective material. Accordingly, the beamsplitter 162 may be located such that the beamsplitter film 166 constitutes a plane of optical symmetry relative to the sources 181 and 182, respectively, when an observer's eye 148 is positioned to view images from these sources in a direction substantially parallel to an axial direction represented by the line 163.

Thus, a bundle 183X of light rays emanating from a point 181X of source 181, such as the center point of a specimen, for example, and normal or very nearly normal to the plane of source 181 is refracted at the surface of the beamsplitter plate 164 and is transmitted through a discrete area 166X of the beamsplitter film 166. Also, a bundle 184X of light rays emanating from a point 182X of source 182, such as the center of a reticle, for example, and normal or very nearly normal to the plane of source 182 is reflected from the discrete area 166X of the beamsplitter film 166. As a result, the respective bundles 183X and 184X of light rays travel a common path 185X from the discrete area 166X of film 166 to the observer's eye 148. Consequently, the observer's eye 148 sees the images of the points 181X and 182X, respectively, in coincidence with one another at the point 186 in virtual image plane 187.

However, in practice, the observer's eye 148 may be moved to observe the point 181X of specimen 181 from a direction making an appreciably large angle $\theta_2$, such as greater than ten degrees, for example, with respect to the axial direction 163. For such an angle $\theta_2$, the beamsplitter film 166 no longer constitutes a plane of optical symmetry between the sources 181 and 182, respectively. A bundle 183Y of light rays emanating from the point 181X of source 181 now travels a different path length within the beamsplitter plate 164 and is transmitted through a discrete area 166Y of film 166 to travel along a path 185Y to the observer's eye 148 at the larger angle $\theta_2$ relative to the axial direction 163. Consequently, the eye 148 sees the discrete area 181X of source 181 at a point 181Y in a new image plane 188 located at a different distance from the beamsplitter 162.

Also, the eye 148 sees in alignment with the point 181Y a different point 182Y in the virtual image plane 187 of source 182. This point 182Y corresponds to a point 189 of image source 188 from which a bundle 184Y of light rays emanates and is reflected along the path 185Y to the observer's eye. Consequently, to the observer's eye 148, it appears that appreciable angular movement of the eye 148, with respect to the axial direction 163, causes lateral movement of the point 181X relative to the point 182X, which may comprise the center of a measurement reticle, for example.

Figure 9:
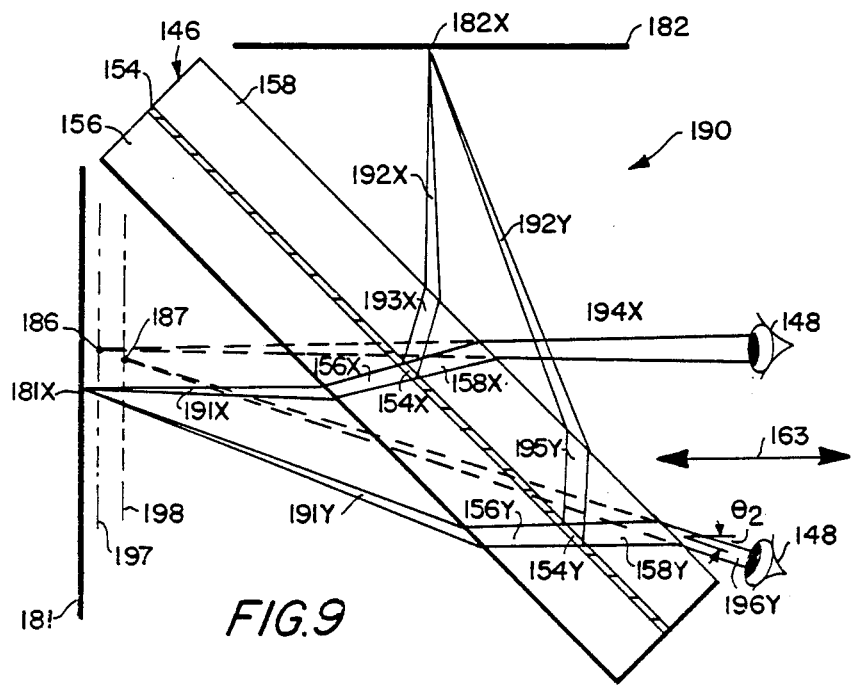
FIG. 9 is a schematic view of an alternative optical system similar to the optical system shown in FIG. 8 but having the novel beamsplitter of this invention positioned symmetrically between the two angularly disposed image sources.

This apparent lateral movement may be eliminated by replacing the conventional beamsplitter 162 with the novel beamsplitter 146, as shown in FIG. 9, to constitute an optical system 190 which is similar to the optical system 180 shown in FIG. 8 except for the beamsplitter incorporated therein. Thus, the optical system 190 comprises respective first and second image sources 181 and 182 which are disposed orthogonally relative to one another for directing respective images along intersecting paths. Angularly disposed between the respective source 181 and 182 is the novel beamsplitter 146 having the semi-transparent film 154 of light reflective material sandwiched between the respective transparent plates 156 and 158. Accordingly, the beamsplitter 146 is located between the respective sources 181 and 182 such that the beamsplitter film 154 constitutes a plane of optical symmetry relative to the sources 181 and 182, respectively, independently of whether or not the observer's eye 148 is positioned to view the images from the respective sources in a direction substantially parallel to the axial direction denoted by line 163.

Thus, a bundle 191X of light rays emanating from point 181X of source 181, such as the center point of a specimen, for example, and normal or very nearly normal to the plane of source 181 is refracted at the adjacent surface of beamsplitter plate 156. As a result, the bundle 191X of refracted light rays follows an optical path comprising transmission through an aligned portion 156X of beamsplitter plate 156, aligned discrete area 154X of the film 154, and an aligned portion 158X of beamsplitter plate 158. Also, a bundle 192X of light rays emanating from a point 182X of source 182, such as the center of a measurement reticle, for example, is refracted at the adjacent surface of beamsplitter plate 158. Consequently, the bundle 192X of refracted light rays follows an optical path including transmission through an aligned portion 193X of plate 158, reflection from aligned discrete area 156X of the film 156, and transmission through the portion 158X of plate 158 followed by the bundle 191X of light rays. As a result, the respective bundles 191X and 192X of light rays emerge from the exposed flat surface of plate 158 at about the same place and travel a common path 194X to the observer's eye 148. Accordingly, the observer's eye 148 sees the images of the respective points 181X and 182X in coincidence with one another at the point 186 in the virtual image plane 197.

In this instance, however, when the observer's eye 148 is moved to observe the point 181X of source 181 from a direction making an appreciably large angle $\theta_2$ relative to the axial direction 163, the beamsplitter film 154 still constitutes a plane of optical symmetry between the respective sources 181 and 182 due to the symmetrical structure of the beamsplitter 146. Thus, a bundle 191Y of light rays emanating from the point 181X of source 181 now is refracted at the surface of beamsplitter plate 156 to follow a longer or shorter optical path within beamsplitter 146 comprising transmission through a portion 156Y of beamsplitter plate 156, an aligned discrete area 154Y of film 154 and an aligned portion 158Y of plate 158. Also, a bundle 192Y of light rays emanating from the point 182X now is refracted at the surface of beamsplitter plate 158 to follow a similarly longer or shorter optical path within beamsplitter 146 comprising transmission through an aligned portion 195Y of plate 158, reflection from the discrete area 156Y of film 156, and transmission through the portion 158Y of plate 158 followed by the bundle 191Y of light rays. As a result, the respective bundles 191Y and 192Y of light rays again emerge from the exposed surface of plate 158 at about the same place and travel a common path 196Y, even though the observer's eye 148 is positioned at the angle $\theta_2$ with respect to the axial direction 163. Accordingly, the virtual image of point 181X and the virtual image of point 182X are coincident at the point 187, even though point 187 may be in a different location from the point 186 previously established in the instance of viewing in the axial direction 163.

It will be apparent to those skilled in the art that the foregoing considerations described with relevance to the observer's eye apply with equal relevance to alternative focusing systems, for example, lenses and focusing mirrors utilized in conjunction with microscopes, telescopes, cameras, and image projectors.

From the foregoing, it will be apparent that all of the objectives of this invention have been achieved by the structures shown and described herein. It also will be apparent, however, that various changes may be made by those skilled in the art without departing from the spirit of the invention as expressed in the appended claims. It is to be understood, therefore, that all matter shown and described herein is to be interpreted in an illustrative rather than in a limiting sense.

What is claimed is:

1. In combination:
   light source means disposed for directing light along a first path;
   first reflective means disposed in said first path for receiving a first portion of said light and reflecting it back along said first path;
   second reflective means disposed in a second path extended angularly relative to said first path from an intersection therewith for receiving a second portion of said light and reflecting it back along said second path;
   light splitting and recombining means disposed at said intersection and having respective first and second surfaces disposed adjacent said first and second paths for splitting said light into said first and second portions, recombining said light reflected back from said first reflective means with said light reflected back from said second reflective means, and directing said recombined light along a third path; and transmissive plate means disposed in intimate contact with said first and second surfaces for providing adjacent said surfaces respective equivalent transmissive media.

2. The combination as set forth in claim 1 wherein said first and second reflective means are similarly spaced from said intersection and said first and second paths measured from said intersection to the respective first and second reflective means are substantially equal in length.

3. The combination as set forth in claim 2 wherein said light splitting and recombining means comprises a semi-transparent layer of reflective material disposed in said first path and oriented at an angle thereto for transmitting said first portion of said light from said source means along said first path to said first reflective means and for reflecting said second portion of said light from said source means along said second path extended angularly relative to said first path.

4. The combination as set forth in claim 3 wherein said first and second paths extend from said intersection substantially orthogonal to one another and said semi-transparent layer is symmetrically disposed between said first and second reflective means.

5. The combination in claim 4 wherein said third path is aligned with said second path and extends in the opposite direction from said intersection.

6. In combination:
   image source means for directing a visible light image along a predetermined path to an intersection of an aligned first path with an angularly extended second path;
   first reflective means disposed in said first path for receiving a first portion of said visible light image and reflecting said first portion back along said first path;
   second reflective means disposed in said second path for receiving a second portion of said visible light image and reflecting said second portion back along said second path;
   image splitting and recombining means positioned in said intersection and having respective opposing surfaces disposed at oblique angles to said first and second paths for directing respective first and second portions of said visible light image along said first and second paths, recombining the respective first and second portions of the visible light image reflected back along said first and second paths, and directing the combined first and second portions of the visible light image along a third path comprising an optical axis along which the combined portions of the visible light image may be viewed as a single image; and
   transmissive plate means disposed in intimate contact with said respective opposing surfaces for providing adjacent said surfaces respective equivalent image transmissive media and ensuring that said combined portions of the visible light image may be viewed at an angle to said optical axis as a single image, independently of the magnitude of said angle.

7. The combination as set forth in claim 6 wherein said image source means is substantially planar and said predetermined path is substantially perpendicular to said planar image source means.

8. The combination as set forth in claim 7 wherein said image splitting and recombining means comprises a semi-transparent layer of light reflective material disposed at said intersection and comprises a plane of symmetry between said first and second reflective means.

9. The combination as set forth in claim 8 wherein said first and second reflective means comprise respective first and second planar reflecting surfaces disposed substantially perpendicular to respective first and second paths.

10. The combination as set forth in claim 9 wherein said third path is aligned with said second path and extends in the opposite direction from said intersection to an exit aperture of suitable dimensions for accomodating the relatively wide viewing angles permitted by said transmissive plate means ensuring that said combined portions of the visible light image may be viewed at a angle to said optical axis as a single image.

* * * * *

UNITED STATES PATENT AND TRADEMARK OFFICE
CERTIFICATE OF CORRECTION

PATENT NO. : 4,772,095

DATED : September 20, 1988

INVENTOR(S) : Gordon R. Spencer

It is certified that error appears in the above-identified patent and that said Letters Patent is hereby corrected as shown below:

On Cover Sheet, please change the Assignee from "Switchcraft, Inc. Chicago, Ill." to --Raytheon Company, Lexington, Mass.--.

Signed and Sealed this

Twenty-eighth Day of February, 1989

*Attest:*

DONALD J. QUIGG

*Attesting Officer*   *Commissioner of Patents and Trademarks*